United States Patent
Vook et al.

(10) Patent No.: US 6,496,914 B1
(45) Date of Patent: Dec. 17, 2002

(54) METHOD AND SYSTEM FOR ADMINISTERING STORAGE DEVICES ON A NETWORK

(75) Inventors: Eric R. Vook, Durham, NC (US); Michael Burriss, Raleigh, NC (US); Mike Bezera, Raleigh, NC (US); Derek Scott, Durham, NC (US); Helga Sonner, Durham, NC (US); Gregory T. Hunt, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 132 days.

(21) Appl. No.: 09/814,662

(22) Filed: Mar. 22, 2001

(51) Int. Cl.[7] .............................................. G06F 12/00
(52) U.S. Cl. ........................... 711/170; 710/8; 709/220
(58) Field of Search .............................. 711/170; 710/8; 709/220

(56) References Cited

U.S. PATENT DOCUMENTS

| | | | |
|---|---|---|---|
| 5,325,497 A | * | 6/1994 | Jaffe et al. ................... 711/114 |
| 5,598,528 A | * | 1/1997 | Larson et al. ................ 711/114 |
| 5,748,980 A | * | 5/1998 | Lipe et al. ................... 710/104 |
| 5,918,241 A | * | 6/1999 | Egy .............................. 710/8 |
| 2002/0103923 A1 | * | 8/2002 | Cherian et al. ............. 709/235 |

* cited by examiner

Primary Examiner—Hiep T. Nguyen
(74) Attorney, Agent, or Firm—A. Jose Cortina; Kilpatrick Stockton LLP (57) ABSTRACT

A host system, such as a server, controls a plurality of different class storage devices on a network. The operating system on the host assigns a unique identification to each storage device using a standard protocol and maintains the identification in the operating system. This allows control of the storage devices without complications even though different classes of devices, using differing identification protocols, are assembled on the same network.

18 Claims, 2 Drawing Sheets

METHOD AND SYSTEM FOR ADMINISTERING STORAGE DEVICES ON A NETWORK

BACKGROUND OF THE INVENTION

1. Field of the Invention

The invention relates to a method and system, including an operating system, for administering a plurality of storage devices, on a network, such as a storage area network which includes controllers. More specifically, the invention relates to a method and system for assigning identification signatures, described herein as Lun signatures, to different types of storage devices on the network to create a uniform signature methodology within an operating system on a host controlling the network. As a result, different classes of storage devices can be administered by the host on the same network.

2. Description of the Prior Art

In networks, in particular, networks including plural storage devices or storage arrays distributed throughout the network, the storage devices typically are identified by unique signatures which are used to identify and configure the devices on a host such as a server. Depending upon the type of device, the signature provides a specific identification unique to that storage device, which is used by the host system controlling the network to enable different functionality, depending on the device, including the aforementioned identifying, configuring and administering of the specific device. For purposes of this disclosure, such signatures will generally be referred to as a logical unit number (Lun) signatures.

It is noted that conventionally, the term "Lun signature" has been used by EMC Corporation and others with reference to different types of storage arrays commercially available from EMC Corporation. While the term Lun signature is used herein for ease of reference and understanding in describing the system and method, it is noted that such term is not limited to the specific types of signatures used by EMC Corporation, and is intended to encompass any such type identification, providing similar functionality, as used in the industry to provide identification and allow configuring and administration of storage devices in a network, as will be readily apparent to those of ordinary skill in the art.

In the past, as technology has developed, different types of storage devices have used different protocols in assigning an identification signature for use in identifying, configuring and controlling such devices on a network. In a specific example, as already noted, such signatures have been employed in connection with storage arrays such as those originally commercially available under the name Clariion, from Data General Corporation, now EMC Corporation. The Clariion-type systems started employing the signature for a derived path identification on the network, and was known as a Lun signature. The Lun signature was specific to the storage processor identification for each storage array on the network. In this context, it will also be appreciated that by the term Lun signature as used herein, is meant the path identification, i.e., ID for a given adapter on a host system, to a specific storage array on a network.

Such signatures can be employed in systems employing a host, such as a server, administering a plurality of storage arrays on a fibre channel-type system, with the host communicating with the various storage arrays through a switch, or where all devices are physically connected without a switch in a loop, as well as on SCSI protocol based systems.

So long as a single type of storage array having a uniform Lun signature protocol is used on a network, it is easy to configure and operate the network. However, as different types of storage arrays use different types of Lun signatures, a performance problem arises, which also compromises data integrity as a result of supporting older styles of Lun signatures.

More specifically, one example of prior art methods of tracking Lun signatures within an operating system such as DG/UX, originally available from Data General and now from EMC Corporation, involves tracking Lun signatures solely with disk-based signatures, except for the aforementioned Clariion-type storage arrays. Storage arrays such as those available under the name Clariion, and other equivalent type arrays, are tracked using a unique vendor specific SCSI mode page which provides the vendor specific signatures of the storage processors (SPs) controlling the storage array.

As new technologies have been developed in fibre channel storage area networks, storage array network (SAN) and network attached storage (NAS) environments, it has become more difficult to accommodate tracking the prior art arrays which used disk-based signatures. More specifically, current technologies operate primarily on world wide name (WWN) based signatures, which are incompatible with the older signatures.

More specifically, prior to the introduction of SAN, every Lun signature on a disk-based signature type device was unique to the specific device. Therefore, if a Lun 0 was found for storage processors having IDs 1 and 2, for example, then there could not be another Lun 0 with the same storage processor (SP) ID. However, with SAN technology, there can be multiple Lun 0s in the same array configured, so a different method other than SP IDs is needed.

In other types of arrays such as those available from EMC Corporation under the name Symmetrix, they do not have SP IDs and only support the WWN standard. Thus, in the case where disk-based signatures are used, this results in both slow and potentially dangerous operations if disk-to-disk copying is done.

Thus, in accordance with the method and system described herein, the prior art problems of administering networks with differing types of storage devices and/or arrays, is avoided, along with other advantages provided by the system and method disclosed herein.

SUMMARY OF THE INVENTION

In one aspect, the invention is directed to a method of configuring an operating system on a host. The host is connected on a network for administering a plurality of storage devices. The network has controllers thereon. The method involves, for storage devices which are storage arrays, and are on the network, and which support world wide name signatures, building a first class of unique Lun signature for each such storage device, which is based on the world wide name signature of each storage device. The Lun signature is built in the operating system, and in the controllers on the network.

For storage devices, which are storage arrays, and are on the network but which do not support world wide name signatures, but have storage processor based signatures, a second class of unique Lun signature is built for each such storage device based on the storage processor based signature of each such storage device, in the operating system and in controllers on the network.

For storage devices which are not storage arrays, and are on the network, a third class of unique Lun signature is built for each such storage device, in the operating system and in controllers on the network.

In a more specific aspect, each Lun signature has a predetermined structure which identifies the type of storage device associated therewith. If a specific storage device does not include a Lun 0, there is created a unique fake Lun 0 for the device, in the operating system and in controllers on the network. The Lun 0s in the operating system are used to support communications with storage devices on the network to allow the operating system to size the network. More specifically, a Lun signature is allocated for every path on the network.

In another aspect, there is described a host system, for example, a server, capable of administering a plurality of devices on the aforementioned type of network. The host system includes at least one processor, although it can be a NUMA class type host system with multiple processors. The host system includes programs configured for administering the network, and the programs include an operating system having a file system with a virtual device manager capable of assigning Lun signatures within the operating system to represent storage devices on the network based on the storage device class. The file system is capable of assigning Lun signatures within the operating system to: (1) storage devices, which are storage arrays which support world wide name signatures, by building a first class of unique Lun signature for each such storage array connected on the network, based on the world wide name signature of each storage device in the operating system, and in the controllers on the network; (2) for storage devices, which are storage arrays, on the network which do not support world wide name signatures, but have storage processors based signatures, by building a second class of unique Lun signature for such storage device, based on the storage processor based signature of each such storage device, in the operating system and on controllers on the network; and (3) for storage devices, which are not storage arrays, on the network, by building a third class of unique Lun signature for each such storage device, in the operating system and in controllers on the network.

In yet still another aspect, there is disclosed an operating system for use on a host system capable of administering a plurality of storage devices when connected thereto on a storage area network, with controllers on the network. The operating system includes a file system as previously described with reference to the host system.

BRIEF DESCRIPTION OF THE DRAWINGS

Having thus briefly described the invention, the same will become better understood from the following detailed discussion, made reference to the appended drawings wherein.

DETAILED DESCRIPTION OF THE INVENTION

Figure 1:
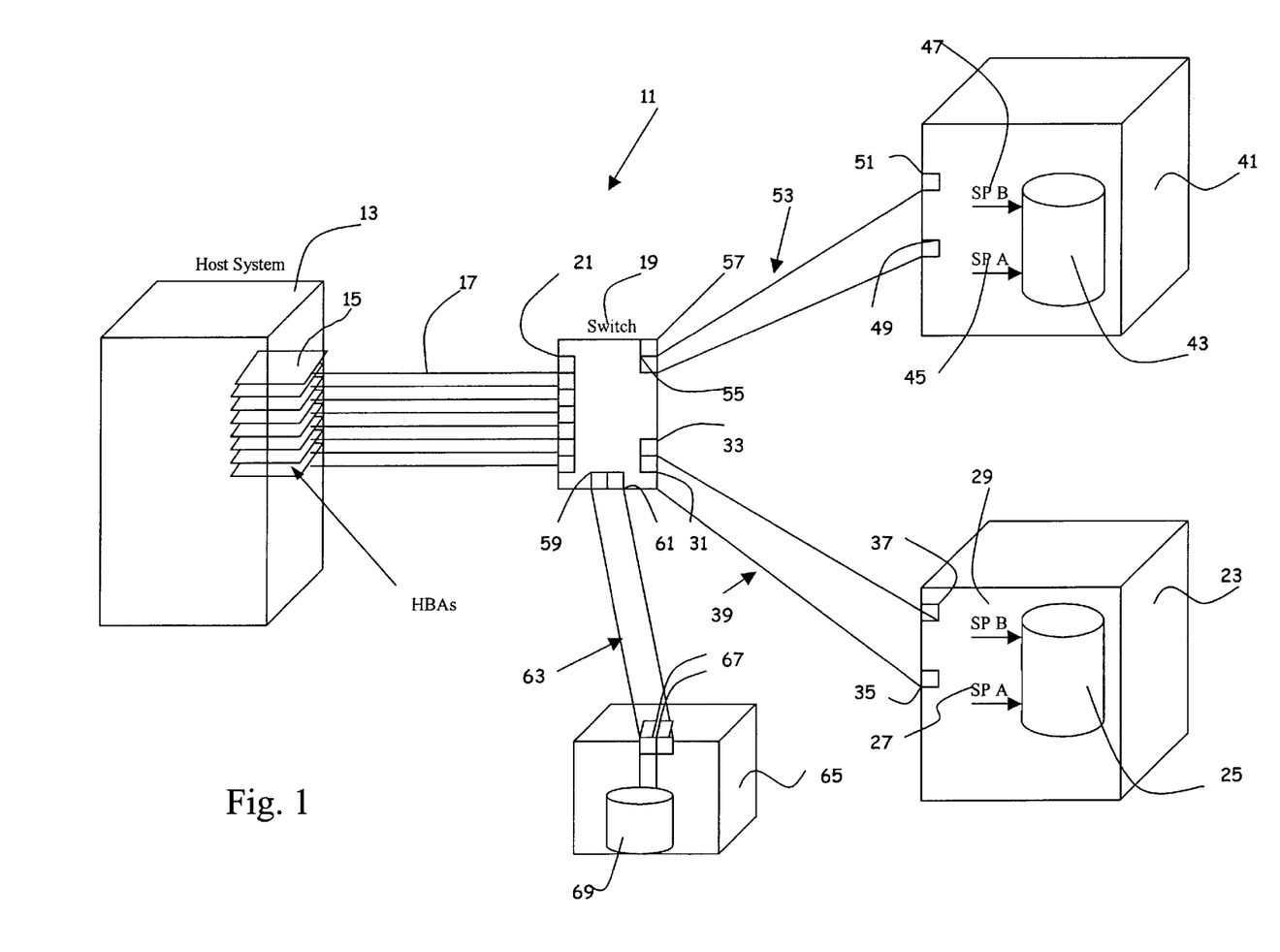
FIG. 1 is a block diagram illustrative of a storage array network having different classes of storage devices connected on the network to a host system.

Referring to FIG. 1, there is disclosed an exemplary system 11 in which a host system 13 has a plurality of adapters 15, i.e., host bus adapters, connected through a switch 19 to different types of storage devices 23, 41 and 69, in a fibre channel configuration in which the system and method of the invention can be employed. While FIG. 1 illustrates a fibre channel switched type system, it will be appreciated by those of ordinary skill in the art from a reading of this disclosure that the system and method are not limited to switched fibre channel arrangements. For example, the system and method can be deployed in other configurations such as a fibre channel arbitrated loop (FC-AL) without a switch in which a number of storage devices are connected in a serial loop arrangement to the host system, as well as in SCSI or other environments. However, for ease of description, reference is made to FIG. 1, in a switched fibre channel environment.

In FIG. 1, the host system 13 includes a plurality of host bus adapters 15 connected to a cable 17, i.e., a fibre channel, to ports 21 at a switch 19 having ports 31, 33, 55, 57, 59 and 61 respectively connected through what is generally known as the fabric 39, 53 and 63, to different class type storage devices 23, 41 and 65. The connections to the devices are made respectively at ports 35, 37, 49, 51 and 67. In the case of storage devices 23 and 41, they can be different types of storage arrays including respective storage processors 27, 29, 45 and 47 which control a disk array 25 or 43, respectively. In the case of storage device 65, this could be a simple disk drive to which the switch 19 is connected at port 67 to the disk drive 69 having no storage processor, and appearing to the host system 13 as a virtual device. In the case of storage device 23, this can be one of the newer type storage arrays such as, for example, those available under the name Symmetrix from EMC Corporation which operate primarily on a world wide name (WWN) naming scheme basis to provide identification of the device on a network. This type device employs what is known as a director port to control interaction with host 13. Such type devices are also available from companies other than EMC Corporation. Further, by the term "director port" is meant a controller equivalent to storage processors, for controlling the storage array. Storage device 41 can be an older type array such as that available under the name Clariion from EMC Corporation. This type of device provides a storage processor based signature for identification and control purposes. Such type devices are also available from companies other than EMC Corporation. As already noted, storage device 65 may be a disk drive 69, which is not an array class storage system and provides a disk-based signature for identification and control purposes.

In accordance with the system and method herein it becomes desirable to standardize in the operating system and controllers deployed throughout the particular network in which the method and system are deployed, the methodology for assigning and reserving identification signatures. Specifically as discussed previously herein, they are referred to as Lun signatures for the respective types of storage devices 23, 41 and 69. This is done, as discussed further herein with reference to FIG. 2, in an operating system 113 making up part of a suite of software 101 resident and functioning in the host system 13.

Figure 2:
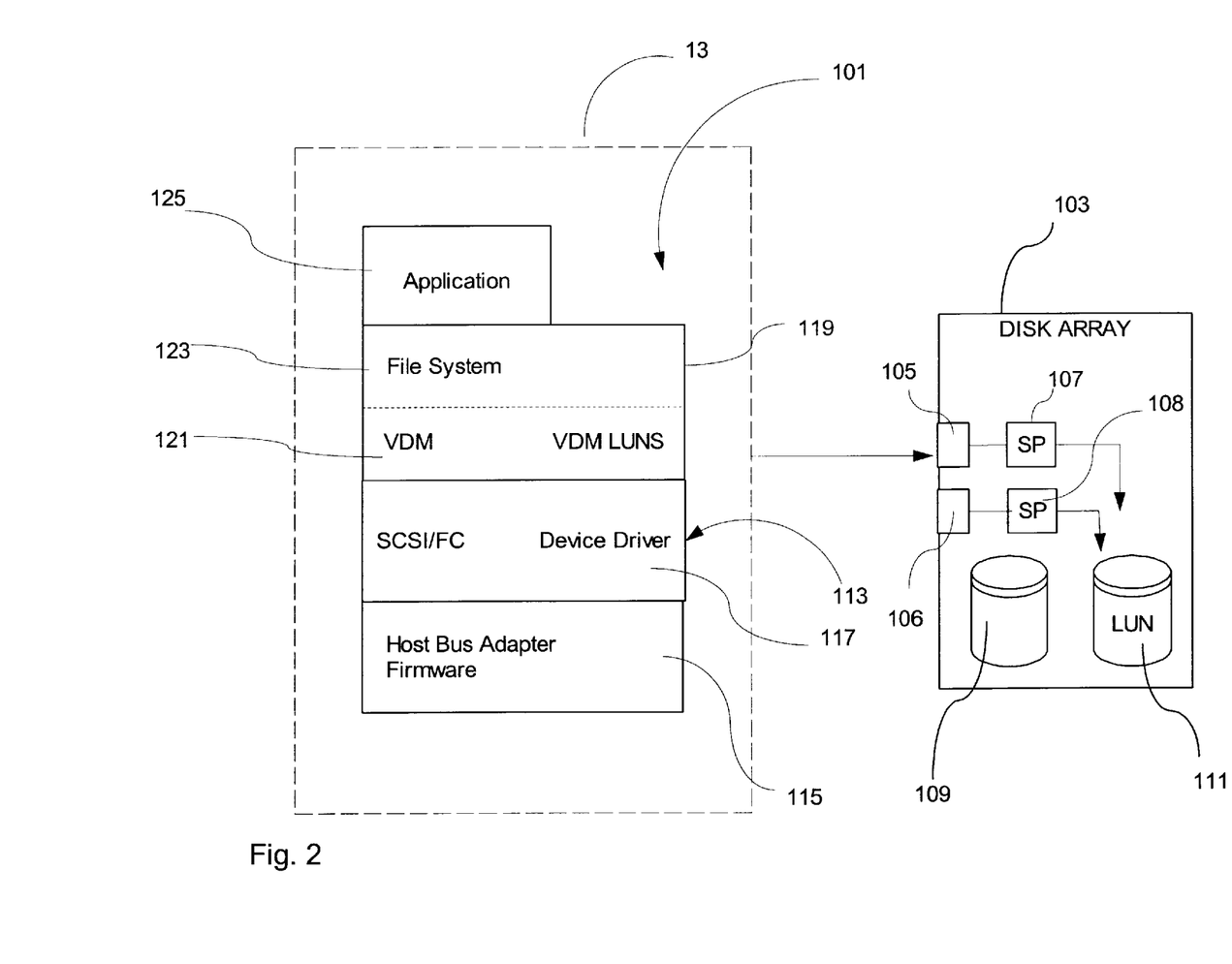
FIG. 2 is a simplified block diagram illustrating a host system connected to a storage device, showing in block diagram the program construction for implementing the method and system described herein.

Such a host system 13 includes as part of the program suite 101 standard applications 125 and the operating system 113. The operating system 113 includes a file system 119, which includes a virtual device manager 121 on which are generated virtual device manager Luns and stored thereon for each of a plurality of storage devices 103 connected on the network, and the remainder portion 123 of the file system. Depending on the type of network, the operating system 113 includes a device driver 117 capable of supporting storage area network connections, SCSI connections and/or fibre channel connections. The device driver 117 sits on top of host bust adapter firmware 115, which also interacts with the operating system 113 within the host system 13.

In such an environment, the host system 13 is connected in one of numerous configurations either directly or indirectly to a ports 105 and 106, for example, of a disk array having storage processors 107 and 108 controlling individual disks 109 and 111 of the disk array. Each individual disk 109, 111 includes its own Lun signature, depending upon the class of disks or protocol used, which may differ from that of other classes of disk arrays connected on the system.

The system and method described hereafter supports older style storage arrays as well as modem style storage arrays and stand-alone disks in the context of a network, such as a fibre channel, SCSI, SAN or NAS environment. In accordance with the method and system described herein, performance problems and potential data integrity problems are fixed when accessing more modem type arrays.

In addition, environments where Lun numbers in a given chassis can be duplicated, but Lun signatures cannot be, such as in SAN and NAS technologies, the individual features of the different types of storage arrays are supported. World wide naming technology is integrated into the disk signature implementation and allows the network user to take fall advantage of new technologies in the fibre channel, SAN and NAS technologies. The standards, as described herein, are made primarily on a world wide name naming scheme basis. In addition, there is created a mechanism by which the operating system generates unique disk signatures, for management level devices, that exist only for management level communication with the arrays, and not for input/output operations.

The system also allows for "hot-swap" of controller cards used to control and connect storage arrays, for example, director cards and storage processor controller cards, and continues to support the older type Lun signatures on legacy type devices that do not support new technologies. By the term "director cards" is meant a storage array controller card containing one or more director ports.

In accordance with the system and method, world wide name (WWN) based signatures are used. All fibre channel based arrays that support SAN or NAS technologies support WWN signatures. On arrays that support WWN based signatures, every Lun has a unique WWN signature that is built from the WWN of the storage processor or director ports, depending on the type of array. WWN signatures are obtained by issuing an inquiry command to the array and asking if it supports WWN. If the return signal indicates that WWN is supported, then a request is issued from the operating system 113 which contains the WWN of the Lun signature.

In the event the disk array 103 is an older fibre or SCSI device such as a storage array like those available under the name Clariion running, for example, a DG/UX operating system or other similar type operating system which does not support WWN, but uses storage processor 107 based signatures, the operating system 113, will continue to use the storage processor (SP) based signatures. Although DG/UX is discussed, the system and method described can be implemented in other operating systems capable of administering a plurality of storage devices on a network such as a storage array network. Examples of such operating systems include those commercially available under the names UNIX, AIX, Solaris, NT, etc.

In accordance with the invention, there is also created a signature solution set of Luns that are used for specific management operations, but cannot be used for registration or input/output (I/O) operations. By the term "registration" is meant enabling the path within the virtual device manager to allow I/O requests to be performed through the virtual device manager. Such a set of Luns is used for sizing and GSCSI operations. A GSCSI (generic SCSI) is a mechanism that allows a management application through specially created device entries within the file system, with the correct permissions, to issue I/O directly into the device driver 117 without involving the virtual device manager (a backdoor I/O into the device driver 117). Such Luns include, but are not limited to "fake Luns," "Volume Logix Luns," and "Gatekeeper Luns."

In the context of the invention, fake Luns are Luns configured for sizing purposes. An algorithm in the operating system 113, and more particularly, the virtual device manager 121 of the file system 119, which is separated into a virtual device manager portion 121 and the rest of the file system 123, can create fake Luns for Lun 0 only if the Lun 0 is not bound and configured on a storage array 103. Thus, in accordance with the system and method, if the operating system configures all of the Luns, then a Lun 0 will be configured, or if a specific Lun is to be configured, a Lun 0 will also be configured. The signature of the fake Lun is constructed by the device driver 117 subsystem based on the chassis-ID of the disk array 103, and is unique, just like WWN or storage processor based signatures.

It will be appreciated that if Lun 0 is bound to a specific storage array, and configured on the array after the fake Lun 0 is configured on the system, then there is a risk that Lun 0 will be marked permanently dead by the device driver 117 because the signature cannot change for a given device once the device is configured. A change from a fake Lun to a real signature would be considered a change in the signature style which is not allowed in accordance with the system and method, since a Lun 0 cannot be de-configured without de-configuring all of the other Luns on the same array 103 through the same adapter, it becomes cumbersome to recover the Lun. As a general rule, a Lun 0 should only be used when initially setting up a storage processor signature type storage array such as those available under the name Clariion. The fake Lun entry can be used to bind the initial Luns on the array.

Volume Logix and Gatekeeper Luns are examples of special Luns used to manage specific features of such arrays. These are examples of specific management Luns on storage arrays like Symmetrix arrays made by EMC Corporation. These Luns are recognizable only by their size which is always constant. If any of the special Luns are found by the configuration process in the operating system 113, the signature of the Lun will be constructed by the device driver subsystem 117 to indicate the special type of Lun.

With the new Lun signatures, it is possible to perform less intrusive "hot-swap" operations of storage arrays. In the past, the device driver 117 subsystem prevented hot-swap operations without de-configuring and re-configuring all of the Lun signature entries in the operating system representing the storage array for which the hot swap occurred. Since each storage processor has a unique world wide name, the swapping of a storage processor caused the device driver subsystem 117 to mark devices dead in the operating system kernel and disallow disk repair operations on the marked devices. By the term "hot swap" is meant the physical replacing of the storage array controller while the storage array is still powered up and the host running the operating system is still running.

In accordance with the method and system herein, the device driver 117 subsystem caches the Lun signature information inside the Lun information structure 121 individual device manager. A Lun signature structure is allocated for every path configured on the system. Caching of the Lun signatures allows the virtual device manager subsystem 121 to figure out the multi-path capabilities of the configured Luns at a faster rate. It also allows the device driver 117 subsystem to validate the Lun signatures after a repair operation because of a failure or a "hot-swap" operation.

More particularly, when a disk array is hot-swapped, the storage processor or director port, as may be applicable, has a new world wide name, but the world wide names of the Lun signatures configured on the array cannot change once the Lun signatures have been bound. With this assumption, the device driver 117 subsystem is able to recover from the world wide name of the storage processor or director changing because it validates the Lun signatures instead of the storage processor's or director port's world wide name. Since the world wide name of the Luns now has to be validated, it is also possible to handle a hot-swap operation on an older SCSI or fibre storage array. This is done by incorporating the virtual device manager storage processor signature hot-swap algorithm in the signature validation path within the device driver 117 fibre recovery mechanism.

When the device driver subsystem 117 detects that a Peer Storage Processor has changed, but the current storage processor is the same, then it assumes that the peer was hot-swapped. If the current storage processor changed, but the Peer Storage Processor is the same, then it assumes that the current storage processor was hot-swapped. If they are both different, all of the Luns are marked permanently dead because there was either a double hot-swap or there is a different storage array connected. The devices are marked permanently dead to avoid possible data corruption that could occur if I/O operations were continued.

Turning now to the specifics of the system and method for implementing Lun signatures,
User Lun Signature Structure Definition The following structures are what define the Lun Signature as seen by a user which could be a user logged into the system or another kernel level driver outside the kernel driver that maintains/builds the signature itself. A user obtains this Lun signature with an ioctl call (DSKIOC_GET_LUN_SIGNATURE) issued on the system to the kernel.

The term Lun Signature is used by, for example, in the case of an operating system such as DG/UX, to describe the unique method for identifying disk devices. The term came out of the term from the aforementioned Clariion storage arrays that have Storage Processor (SPs) with unique Ids known as SP Signature Ids. However, while the term Lun signature is used in the context of specific devices, it is intended to have a broader meaning in the context of the method and system, as was previously defined herein.

Thus, even though the new system and method uses more that just Storage Processor (SP) Signatures in determining uniqueness, the term Lun Signature is still used to describe it.

In an exemplary manner, the following is a breakdown of a typical structure used by users in an operating system such as DG/UX.

```
struct dsk_get_lun_signature
{
int                                    version;
dsk_topology_class_enum_type           topology_class;
dsk_array_class_enum_type              array_class;
dsk_array_signature_class_enum_type    array_signature_class;
dsk_lun_class_enum_type                lun_class;
dsk_lun_signature_class_enum_type      lun_signature_class;
union
{
```

-continued

```
struct dsk_array_signature_clariion_1    clariion_1_info;
struct dsk_array_signature_symmetrix_1   symmetrix_1_info;
} array_signature;
union
{
struct dsk_lun_signature_constructed_1   constructed_1 info;
struct dsk_lun_signature_sp_id           sp_id_info;
struct dsk_lun_signature_wwid            wwid_info;
} lun_signature;
};
```

1) Topology_class:

The topology-class structure tells you the topology of the device having this Lun signature. This information can be used by the user for any purpose, and is illustrated as follows.

```
typedef enum
    {
    Dsk_Topology_Class_Other      = 0,
    Dsk_Topology_Class_SCSI       = 1,
    Dsk_Topology_Class_FC_AL      = 2,
    Dsk_Topology_Class_FC_Fabric  = 3
    /*<---------------------------*/
    }   dsk_topology_class_enum_type ;
    /*>---------------------------*/
```

The 3 main classes supported by the topology class Lun Signature are SCSI, Fibre Channel FC-AL (fibre channel arbitrated loop), and Fibre Channel FC-SW (fibre channel fabric switch) devices.

2) Array Class:

The Array Class structure tells a user the type of storage array this Lun Signature is associated with. The three supported classes in this specific example are Clariion arrays, Symmetrix arrays, and "None"(standalone disk).

```
typedef enum
    {
    Dsk_Array_Class_None          = 0,
    Dsk_Array_Class_CLARiiON_1    = 1,
    Dsk_Array_Class_Symmetrix_1   = 2
    /*<------------------------*/
    }   dsk_array_class_enum_type   ;
    /*>------------------------*/
```

3) Array_signature_class:

The Array Signature Class tells a user what type of signature style to expect given the type of storage device. Currently this is one to one with the 45 array_class, but this could change as technologies advance, so this is designed into the structure. This would allow, for instance, supporting multiple signature classes on a Symmetrix type array or other functionally equivalent type array without having to change the logic of the array_class itself.

```
typedef enum
    {
    Dsk_Array_Signature_Class_None         = 0,
    Dsk_Array_Signature_Class_CLARiiON_1   = 1,
    Dsk_Array_Signature_Class_Symmetrix_1  = 2
    /*<---------------------------------*/
    }   dsk_array_signature_class_enum_type ;
    /*>---------------------------------*/
```

4) Lun_class:

The Lun Class allows determining what type of Lun device this Lun signature is associated with. Since various types of fake and constructed signatures are allowed, this allows distinguishing between them.

```
typedef enum
{
    Dsk_Lun_Class_Normal                             = 0,
    Dsk_Lun_Class_DGUX_Fake                          = 1,
    Dsk_Lun_Class_Array_Control                      = 2,
    Dsk_Lun_Class_Symmetrix_Gatekeeper               = 3,
    Dsk_Lun_Class_Symmetrix_Volume_Logix             = 4,
    Dsk_Lun_Class_Symmetric_SymmPath_Gatekeeper      = 5,
    Dsk_Lun_Class_Symmetrix_SymmPath_Common_Volume   = 6,
    Dsk_Lun_Class_Symmetrix_Clusters_Quorum_Disk     = 7,
    Dsk_Lun_Class_Celerra_Gatekeeper                 = 8
    /*<----------------------*/
}       dsk_lun_class_enum_type ;
    /*>----------------------*/
```

5) Luni_signature_class:

The Lun signature class works similarly to array_signature_class. This allows knowing what type of signature there is for the device type indicated by the Lun_class. These currently correspond to the 3 types of signature that are supported by the kernel. A value of "None" indicates that the kernel could not generate a Lun signature for a specified device. Lun signatures are not maintained by the kernel for standalone disk drives. Only Lun signatures for storage arrays are maintained.

```
typedef enum
{
    Dsk_Lun_Signature_Class_None           = 0,
    Dsk_Lun_Signature_Class_Constructed_1  = 1,
    Dsk_Lun_Signature_Class_SP_ID          = 2,
    Dsk_Lun_Signature_Class_WWID           = 3
    /*<-------------------------------*/
}       dsk_lun_signature_class_enum_type ;
    /*>-------------------------------*/
```

6) Union of the Array_signature:

The type of structure used depends on what the array_signature_class indicates. The array signature class dictates the structure defined.

```
union
{
    struct dsk_array_signature_clariion_1    clariion_1_info;
    struct dsk_array_signature_symmetrix_1   symmetrix_1_info;
} array_signature;
A) Clariion_1_info:
    struct dsk_array_signature_clariion_1
    {
        unsigned    char                    array_id
        [DSK_ARRAY_SIG_CLARIION_1_LENGTH];
    };
B) Symmetrix_1_info:
    struct dsk_array_signature_symmetric_1
    {
        unsigned    char                    array_id
        [DSK_ARRAY_SIG_SYMMETRIX_1_LENGTH];
    };
```

7) Union of Lun Signature:

The type of structure used depends on what the Lun_signature_class indicates. The Lun signature class dictates the structure defined.

```
union
{
    struct                dsk_lun_signature_constructed_1 constructed_1_info;
    struct dsk_lun_signature_sp_id    sp_id_info;
    struct dsk_lun_signature_wwid     wwid_info;
} lun_signature;
A) constructed_1_info:
    struct dsk_lun_signature_constructed_1
    {
        unsigned char      constructed_id
        [DSK_LUN_SIG_CONSTRUCTED_1_ID_LENGTH);
    };
```

1) constructed_id —The constructed Lun signature generated, for example, by the DG/UX kernel. A fake Lun signature is a form of a constructed Lun signature.
B) sp_id—info:

This is the SP ID structure used for backwards compatibility and rolling cluster upgrades. By the term "rolling cluster upgrade" is meant an upgrade method in which one node of the cluster is upgraded to a newer version of the operating system but still has to operate in the cluster with other nodes that have not yet been upgraded. Therefore, when upgraded to the new signature style, the node must still be capable of communicating with other nodes that do not support the new signature style.

```
struct dsk_lun_signature_sp_id
{
    unsigned    int                            sp_id
[DSK_LUN_SIG_SP_ID_NUMBER_OF_IDS];
    unsigned int       lun_number;
};
```

1) sp_id—The SP IDs obtained from, for example, a Clariion storage array. This will contain the current and peer SP ID signature information.
2) Lun_number—The Lun number associated with this Lun signature.
C) wwid_info—The WWN Lun signature determined by the kernel is stored here for the user. The various styles are defined by the IEEE FC-PH-3 standard.

```
struct dsk_lun_signature_wwid
{
    unsigned char    wwid [DSK_LUN_SIG_WWID_LENGTH);
};
```

Kernel Lun Signature Structure Definition The following structures are what define the Lun Signature within, for example, the kernel of the DG/UX operating system environment. The term Lun Signature, as previously noted, is used in an exemplary manner with respect to the DG/UX operating system to describe the unique method for identifying disk devices. As already noted, the term came out of the term from Clariion type storage arrays that have Storage Processor (SPs) with unique Ids known as SP Signature Ids. It is intended, in the context of the method and system, to have a broader meaning, as previously defined.

Thus, even though the new design uses more that just SP Signatures in determining uniqueness, the term Lun Signature is used to describe it.

With this said, here is the break down of the structure used internally, for example, in the DG/UX operating system kernel.

```
typedef struct
    {
    int32_type                              version;
    dev_scsi_signature_class_enum_type      signature_style;
    dev_scsi_serial_number_class_enum_type  serial_number_style;
    union
        {
        bit8e_type
    lun_wwn_style[DEV_SCSI_MAX_WWN_SIZE];
        dev_sauna_sp_signature_type     sp_style;
        dev_scsi_fake_signature_type    fake_lun_signature;
    } signatures;
    bit8e_type          serial_number
                        [DEV_SCSI_SERIAL_NUMBER_SIZE];
        /*<--------------------------*/
    }   dev_scsi_common_signature_type   ;
        /*>--------------------------*/
```

1) Signature_style:

This enumerated type defines the different classes of signatures that the DG/UX operating system currently supports. This is designed to be extended in the future when new classes of technology warrant the extension.

```
typedef enum
    {
    dev_scsi_signature_class_sp_signature                          = 0,
    dev_scsi_signature_class_get_world_wide_name_info              = 1,
    dev_scsi_signature_class_fake_lun_signature                    = 2,
    dev_scsi_signature_class_gate_keeper_lun_signature             = 3,
    dev_scsi_signature_class_volume_set_addressing_control_lun_signature = 4,
    dev_scsi_signature_class_volume_logix_lun_signature            = 5,
    dev_scsi_signature_class_edm_symmpath_gate_keeper_lun_signature = 6,
    dev_scsi_signature_class_edm_symmpath_common_volume_lun_signature = 7,
    dev_scsi_signature_class_quorun_disk_for_clusters_lun_signature = 8,
    dev_scsi_signature_class_celerra_gate_keeper_lun_signature     = 9,
    dev_scsi_signature_class_not_supported                         = 0xFF
        /*<------------------------------*/
    }   dev_scsi_signature_class_enum_type;
        /*>------------------------------*/
```

2) Serial_number_style: Part of the Lun Signature's uniqueness is the system serial number of the storage array being communicated with. Currently, in an exemplary manner, Clariion and Symmetrix class storage arrays are supported. The 'None' serial number type is used for legacy standalone disk that are not storage arrays (i.e. the hard drive in a desktop). This is also designed to be extended when support for new classes of storage arrays is needed.

```
typedef enum
    {
    Dev_Scsi_Serial_Number_None,
    Dev_Scsi_Serial_Number_Clariion,
    Dev_Scsi_Serial_Number_Symmetrix
        /*<-----------------------------------*/
    }   dev_scsi_serial_number_class_enum_type;
        /*>-----------------------------------*/
```

3) Union of different styles. All signatures either obtained or derived, for example, in the DG/UX operating system are one of the three following styles and each style is unique even in the presence of the other signature styles:

A) Lun_wwn_style:

World Wide Name (WWN) support is present. This style of signature is supported on SAN (Storage Area Network) and NAS (Network Attached Storage) class devices. (NOTE: The formats for the WWNs themselves are defined by the IEEE FC-PH-3 standard.)

B) sp_style:

Legacy style signature. This is the style of signature that was used prior to this structure being defined. This structure is capable of maintaining the old style signature definition that, for example, an operating system like DG/UX, and other like systems, use for regression and cluster rolling upgrade.

```
typedef struct
    {
    bit8e_type
    current_sp_signature
    [DEV_MAX_SAUNA_SP_SIGNATURE_SIZE];
    bit8e_type
    peer_sp_signature
    [DEV_MAX_SAUNA_SP_SIGNATURE_SIZE];
        /*<--------------------------*/
    }   dev_sauna_sp_signature_type   ;
        /*>-------------------------*/
```

1) current_sp_signature—This is the SP ID signature referred to previously. This represents the SP ID of the storage processor (SP) that services request for these values.

2) peer_sp_signature—This is the SP ID signature of the second SP in for example, a storage array similar to the Clariion storage arrays. Each SP in the array knows the ID of itself and its peer. (NOTE: If a request is made to the peer for its SP ID, and that of its peer, the values above would be swapped.)

C) fake_Lun_signature:

Having this type of signature means that the device with which a user is communicating is a virtual device that is used for sizing and array management functionality only. This type of signature is uniquely constructed within the kernel and does not allow read/write IO to occur on this device.

```
typedef struct
    {
    dev_scsi_fake_signature_tag_enum_type   tag;
    uint32_type                             lun;
```

-continued

```
    bit8e_type
    constructed_id
    [DEV_SCSI_MAX_FAKE_LUN_SIGNATURE_SIZE];
}
/*<---------------------------*/
    dev_scsi_fake_signature_type ;
    /*>---------------------------*/
```

1) tag - This tag values simply tells you whether the constructed_id field is a serial number base contructed ID or not.
2) Lun - The Logical Unit Number being associated with the fake Lun type.
3) constructed_id - This ID is constructed uniquely by the kernel to be used in the same manner as the other two types of signatures.

Having thus specifically described the invention, the same will become better understood from the appended claims, in which it is set forth in a non-limiting manner.

What is claimed is:

1. A method of configuring an operating system on a host administering a plurality of storage devices, with controllers on a network, comprising:
    for storage devices, which are storage arrays, on the network, and which support world wide name signatures, building a first class of unique Lun signature for each such storage device, based on the world wide name signature of each storage device, in the operating system and in the controllers on the network;
    for storage devices, which are storage arrays, on the network, and which do not support world wide name signatures, but have storage processor based signatures, building a second class of unique Lun signatures for each such storage device, based on the storage processor based signature of each such storage device, in the operating system and in controllers on the network; and
    for storage devices, which are not storage arrays, on the network, building a third class of unique Lun signature for each such storage device, in the operating system and in controllers on the network.

2. The method of claim 1 wherein each Lun signature has a predetermined structure which identifies the type of storage device associated therewith.

3. The method of claim 1, further comprising, if a Lun signature created for a specific device does not include a Lun 0, creating a unique fake Lun 0 for said device, in the operating system and in controllers on the network.

4. The method of claim 3, further comprising using each Lun 0 in the operating system to support communications with storage devices on the network to allow the operating system to size the network.

5. The method of claim 1, further comprising allocating a Lun signature for every path on the network.

6. The method of claim 1, wherein the Lun signatures comprise:
    (a) a world wide name based signature for use with storage area network or network attached storage class devices;
    (b) legacy based signatures for use with devices using signature styles used prior to world wide name signatures being used; and
    (c) constructed Lun signatures for use with virtual devices in array and management functionality.

7. A host system capable of administering a plurality of storage devices when connected thereto on a network, and with controllers on the network, comprising:
    at least one processor, a storage system, at least one adapter, and programs configured for administering a network;
    the operating system including a file system with a virtual device manager capable of assigning Lun signatures to storage devices on the network, based on the storage device class; and
    the file system being capable of assigning Lun signatures,
        (1) for storage devices, which are storage arrays, which support world wide name signatures, by building a first class of unique Lun signatures for each such storage array connected on the network, based on the world wide name signature of each storage device, in the operating system and in the controllers on the network;
        (2) for storage devices, which are storage arrays, on the network which do not support world wide name signatures, but have storage processor based signatures, by building a second class of unique Lun signatures for such storage device, based on the storage processor based signature of each such storage device, in the operating system and on controllers on the network, and
        (3) for storage devices, which are not storage arrays, on the network, by building a third class of unique Lun signatures for each such storage device, in the operating system and in controllers on the network.

8. The host system of claim 7, wherein each Lun signature has a predetermined structure which identifies the type of storage device associated therewith.

9. The host system of claim 8, further comprising, if a Lun signature created for a specific device does not include a Lun 0, the file system being capable of creating a unique fake Lun 0 for said device, in the operating system and in controllers on the network.

10. The host system of claim 9, wherein each Lun 0 in the operating system is for use in supporting communications with storage devices on the network to allow the operating system to size the network.

11. The host system of claim 7, wherein the file system is capable of allocating a Lun signature for every path on the network.

12. The host system of claim 7, wherein the file system is capable of assigning Lun signatures which comprise:
    (a) world wide name based signatures for use with storage area network or network attached storage class devices;
    (b) legacy based signatures for use with devices using signature styles used prior to world wide name signatures being used; and
    (c) constructed Lun signatures for use with virtual devices in array and management functionality.

13. An operating system for use on a host system capable of administering a plurality of storage devices when connected thereto on a network, with controllers on the network, the operating system comprising:
    a file system with a virtual device manager capable of assigning Lun signatures to storage devices on the network based on the storage device class; and
    the file system being capable of assigning, the Lun signatures
        (1) for storage devices, which are storage arrays, which support world wide name signatures, by building a first class of unique Lun signatures for each such storage array connected on the network, based on the world wide name signature of each storage device, in the operating system and in the controllers on the network;

(2) for storage devices, which are storage arrays, on the network which do not support world wide name signatures, but have storage processor based signatures, by building a second class of unique Lun signatures for such storage device, based on the storage processor based signature of each such storage device, in the operating system and on controllers on the network, and (3) for storage devices, which are not storage arrays, on the network, by building a third class of unique Lun signatures for each such storage device, in the operating system and in controllers on the network.

14. The operating system of claim 13, wherein each Lun signature has a predetermined structure which identifies the type of storage device associated therewith.

15. The operating system of claim 14, further comprising, if a Lun signature created for a specific device does not include a Lun 0, the file system being capable of creating a unique fake Lun 0 for said device in the operating system and in controllers on the network.

16. The operating system of claim 13, wherein each Lun 0 in the operating system is for use in supporting communications with storage devices on the network to allow the operating system to size the network.

17. The operating system of claim 13, wherein the file system is capable of allocating a Lun signature for every path on the network.

18. The operating system of claim 13, wherein the file system is capable of assigning Lun signatures which comprise:
 (a) world wide name based signatures for use with storage area network or network attached storage class devices;
 (b) legacy based signatures for use with devices using signature styles used prior to world wide name signatures being used; and
 (c) constructed Lun signatures for use with virtual devices in array and management functionality.

* * * * *

UNITED STATES PATENT AND TRADEMARK OFFICE
CERTIFICATE OF CORRECTION

PATENT NO.    : 6,496,914 B1
DATED         : December 17, 2002
INVENTOR(S)   : Eric R. Vook et al.

It is certified that error appears in the above-identified patent and that said Letters Patent is hereby corrected as shown below:

Column 5,
Lines 16 and 21, delete the word "modem" and insert -- modern --;

Column 9,
Line 21, delete the word "Luni" and insert -- Lun --; and

Column 11,
Line 35, delete the word "quorun" and insert -- quorum --.

Signed and Sealed this

Eighth Day of April, 2003

JAMES E. ROGAN
*Director of the United States Patent and Trademark Office*